No. 687,369. Patented Nov. 26, 1901.
H. F. CUNTZ.
GEAR CUTTING MACHINE.
(Application filed Apr. 13, 1899.)
(No Model.) 2 Sheets—Sheet 1.

Witnesses: Inventor:

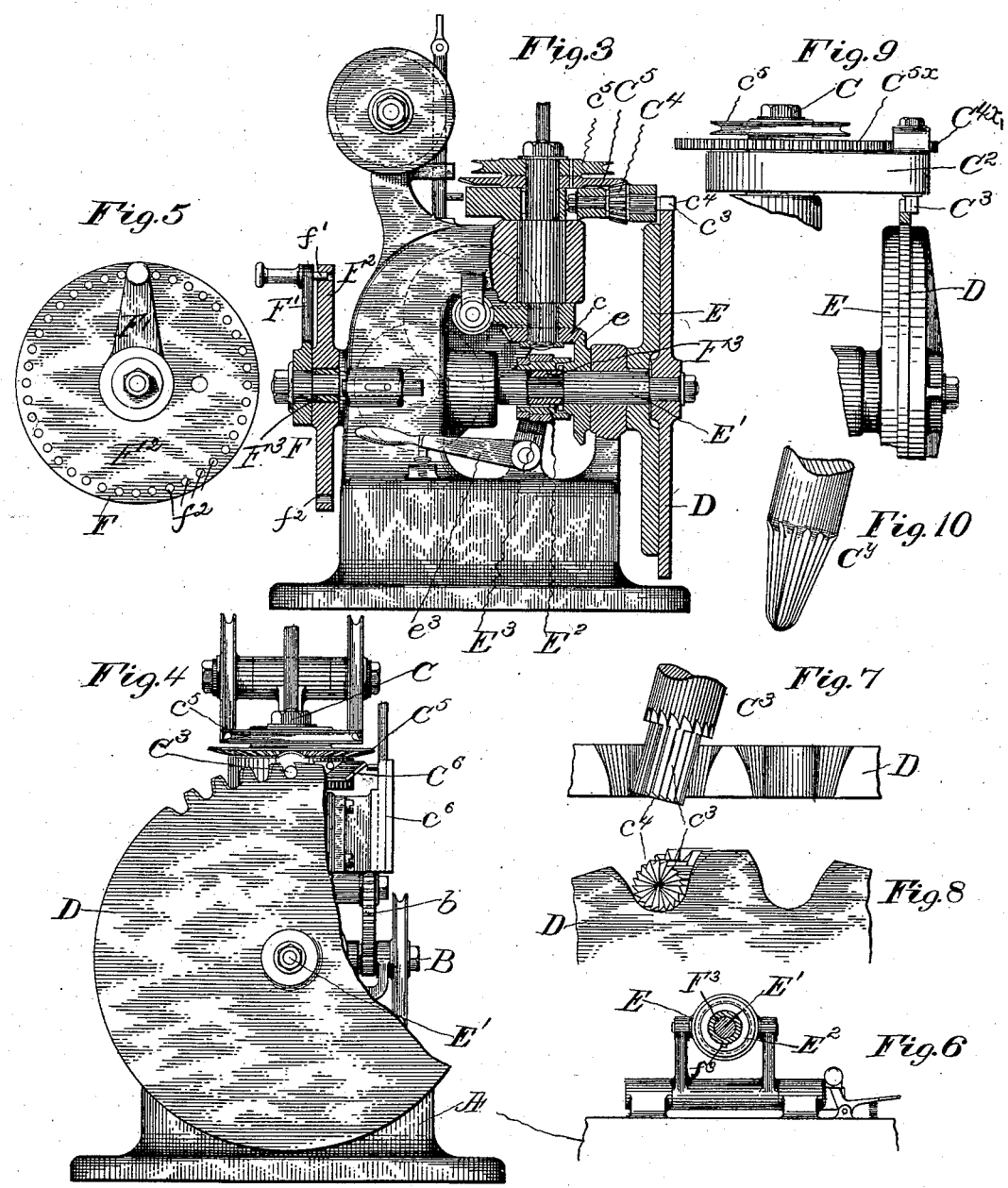

UNITED STATES PATENT OFFICE.

HERMANN F. CUNTZ, OF HARTFORD, CONNECTICUT, ASSIGNOR TO AMERICAN BICYCLE COMPANY, OF JERSEY CITY, NEW JERSEY, AND BOROUGH OF MANHATTAN, NEW YORK, N. Y., A CORPORATION OF NEW JERSEY.

GEAR-CUTTING MACHINE.

SPECIFICATION forming part of Letters Patent No. 687,369, dated November 26, 1901.

Application filed April 13, 1899. Serial No. 712,840. (No model.)

*To all whom it may concern:*

Be it known that I, HERMANN F. CUNTZ, a citizen of the United States, residing in the city and county of Hartford, State of Connecticut, have invented certain new and useful Improvements in Gear-Cutting Machines, of which the following is a specification, reference being had to the accompanying drawings, forming a part hereof.

This invention relates to gear-cutting machines of that class known more generally as "bevel-gear-cutting machines," coming within the general class of angle - gears, and in which the cutter or cutting-tool moves during the operation of cutting substantially in the path of the corresponding tooth of the gear which is to mesh with the gear being cut. The machine which embodies the invention has been devised for cutting such gears of the general class above referred to, and more especially for cutting the gear of a pair of bevel-gears, which meshes with a mating gear of the pin or lantern variety. It has been proposed heretofore to produce machines capable of cutting such gears, and the requirements of such gears and, in a general way, of machines for cutting them are well understood and need not be discussed herein. In this case the objects of the invention are to improve the construction and operation of machines of the character referred to, to make the point of attachment of the blank more accessible, arrange the parts to facilitate manipulation of cutter-head and blanks, and especially to produce such a machine in which the cutter (of the cylindrical or conical milling type) is unsupported at one end, and, furthermore, may cut on its end as well as its face, whereby the machine will be capable of producing gears to mate perfectly with gears having pins extended radially from the circumference or extended from the margin parallel with the axis.

The invention is illustrated in a convenient and practical embodiment thereof for purposes of illustration in the accompanying drawings, in which—

Figure 1:
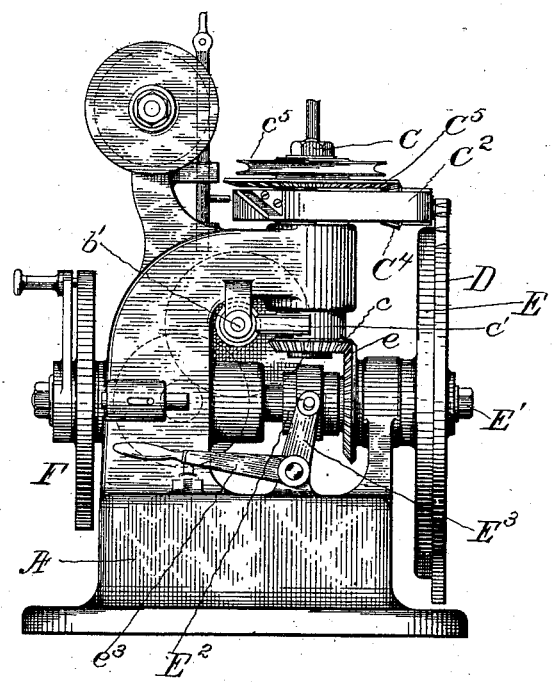
Figure 2:
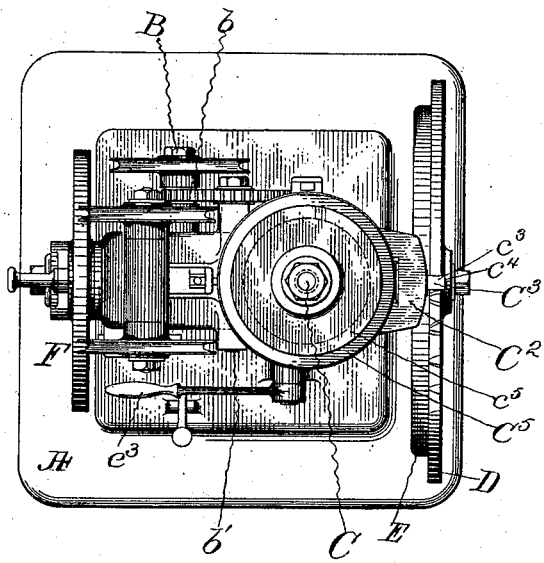

Figure 1 is a view in side elevation of a machine which embodies the invention. Fig. 2 is a plan view of the same. Fig. 3 is a view partly in side elevation and partly in vertical section. Fig. 4 is a front elevation, the gear-blank being partly broken away to show parts behind it. Fig. 5 is a detail view of the indexing device. Fig. 6 is a detail view of the friction-clutch, hereinafter referred to. Figs. 7 and 8 are detail views on a larger scale, showing a cutter in operative relation with the gear-blank. Fig. 9 is a partial view in side elevation, illustrating the arrangement of the machine with a cutter parallel with the axis of its carrier; and Fig. 10 is an enlarged view showing a modified form of cutter.

The machine frame or pedestal A is suitably formed to support the several working parts of the machine, and mounted thereon in suitable bearings is a short driving-shaft B, from which through suitable intermediate gearing—such as the spur-gears $b$, worm-shaft $b'$, and worm-gear or segment $c'$—motion is transmitted to a cutter-carrier shaft C, which for convenience is disposed vertically in a suitable bearing in the frame-head. A cutter-carrier arm $C^2$ is secured to the shaft C, and mounted in suitable bearings in said arm or carrier is a cutter $C^3$ or short shaft which has the cutter secured thereon or formed therewith. The cutter projects outwardly from the arm or carrier with its outer end free and unsupported, so that it may be formed with milling-teeth not only upon its face or cylindrical surface, as at $c^3$, but upon its end, as at $c^4$. As shown in Figs. 1, 2, 3, and 4, the cutter is radially disposed with respect to its carrying-shaft and is provided with a bevel-pinion $C^4$, which is engaged by a bevel-gear $C^5$, mounted loosely with its driving-pulley $c^5$ on the shaft C above the arm $C^2$, so that it may be rotated independently of the shaft and drive the cutter at working speed during the movement of the carrier, hereinafter described. It is possible, however, according to the nature of the work to be performed to variously arrange the axis of the cutter and also to change its form, and in Fig. 9 the cutter is shown with its axis disposed parallel with the axis of the carrier and with the cutter $C^3$, formed as before, parallel with the axis of the shaft C and carrier-arm $C^2$ and provided with a pinion $C^{4x}$, which is engaged by a spur-gear $C^{5x}$, loosely mounted, as before, on the shaft C with its driving-pulley $c^5$. In Fig. 10 a modification as to form of the cutter is shown in which the cutter $C^y$ is rounded on the end and also of conical form, and this cutter may have other possible variations and conditions. It will be understood that the cutter not only rotates upon its own axis, but that it has also a revolutionary movement or movement in the arc of a circle corresponding with the movement of the pin of the gear which it represents. In the machine shown in the drawings there is but one cutter, and instead of giving it a continuous rotary movement in one direction about the axis of its carrier the machine is so arranged that after the cutter has been moved in the arc of a circle through a partial rotation far enough to engage the gear-blank, complete its cut, and disengage the gear-blank on the other side of the tangent-point the machine may be stopped and the cutter returned by hand or otherwise to its original position, while by the aid of suitable indexing mechanism the gear-blank is moved forward to bring another portion of its surface into operative relation with the cutter. For the purpose of stopping the machine a cam $C^6$ for coöperation at the proper time with a belt-shipper slide, which is sufficiently indicated at $c^6$, may be arranged upon the hub of the arm $C^2$.

It will be understood that the gear-blank, which is represented at D, is moved with the same circumferential speed of pitch-circle as that of the cutter in its rotary movement or movement in the arc of a circle about the axis of its carrier, the relative rotation or speed of movement of the blank-periphery and the cutter in their respective planes being the same as the relative movement or speed of movement of the completed gear and its mating pin-gear. For the purpose of supporting the gear-blank in proper relation to the cutter and of giving it the required movement the blank D is secured to a work-carrier E, which is mounted upon a work-shaft E' to rotate therewith. The said shaft is rotated at the proper speed with respect to the cutter-carrier shaft C through properly-porportioned bevel-gears $c$ and $e$ on the respective shafts. During the operation of indexing by means of an ordinary indexing device shown at F as applied to the shaft E' it is necessary that the said shaft should be free to rotate independently of the shaft C, and for this purpose the gear $e$ is loose upon the shaft E' and is adapted to be coupled thereto by means of a suitable clutch. As shown, the hub of the gear $e$ constitutes one member of a friction-clutch, the other member $E^2$ being free to slide longitudinally with respect to the shaft, but held to rotate therewith through the indexing mechanism. The clutch member $E^2$ is engaged by a yoke $E^3$, which is provided with a suitable operating-lever $e^3$.

The indexing mechanism shown in the drawings is constructed and arranged as follows: A radius-arm F', having a pin $f'$, is fixed to the shaft E', the pin being adapted to enter one or another of the holes $f^2$ in a disk $F^2$, secured to a sleeve $F^3$ on the shaft E'. The sliding clutch member is held to rotate with the sleeve $F^3$ by a slot and feather, (indicated at $f^3$.) Thus when the clutch is withdrawn the shaft is entirely free from the driving mechanism, and by withdrawing the pin $f'$ the shaft, with the gear-blank thereon, can be rotated partially with respect to the sleeve and disk to bring the pin into alinement with another hole in the disk and to bring a fresh portion of the gear-blank into operative relation with the cutter.

The relation of the cutter to the work during the operation of the machine being clearly shown in Figs. 7 and 8 of the drawings, the mode of operation of the machine will be clearly understood from the foregoing description of its construction and operation without further explanation herein.

It will be observed that the clutch above referred to and the gear $e$, forming the connection with the driving mechanism, are located at a distance from the intersection of the axis of the gear $c$ (representing the driving mechanism and the cutter) less than the distance of the carrier E and the blank D from such point of intersection, or, in other words, that the said carrier and blank are at the outer end of the shaft E', so that it is possible to remove and replace them without removing any other parts of the machine. It will be further observed that the gear-blank is supported with its axis substantially parallel with the plane in which the cutter-carrier moves and that it has its own movement in a plane substantially at right angles with such plane, whereby the machine is adapted for cutting teeth on the periphery of a disk-like blank. It will also be understood that the details of construction and arrangement may be varied without departing from the spirit of the invention.

I claim as my invention—

1. In a gear-cutting machine, the combination of a shaft, means to secure a disk like gear-blank upon the end of said shaft, a cutter-carrier shaft disposed at an angle with respect to the first-named shaft and located in the same vertical plane with its axis, a cutter-carrier on the second shaft, a milling-cutter with one end free, supported by said carrier radially with respect to the second shaft and with its cutting-surface in contact with the edge of said gear-blank, means for rotating the cutter, and means for imparting corresponding movement to said shafts, substantially as shown and described.

2. A gear-cutting machine comprising a cutter-carrier and a blank rotatable about intersecting axes, a milling-cutter on said carrier and unsupported at one end, means for rotating said cutter upon its own axis, means for supporting the gear-blank in operative relation with said cutter, and means for rotating and for controlling the relative rotation of the blank and cutter-carrier, said means being located at a distance from the point of intersection of their axes of rotation less than the distance of said carrier and blank from such point of intersection, whereby said blank and carrier can be removed without removing other parts of the machine, substantially as shown and described.

HERMANN F. CUNTZ.

Witnesses:
 FELTON PARKER,
 HAMD. E. HART.